United States Patent [19]
Kates

[11] Patent Number: 5,430,641
[45] Date of Patent: Jul. 4, 1995

[54] SYNCHRONOUSLY SWITCHING INVERTER AND REGULATOR

[75] Inventor: Barry K. Kates, Austin, Tex.

[73] Assignee: Dell USA, L.P., Austin, Tex.

[21] Appl. No.: 192,944

[22] Filed: Feb. 7, 1994

Related U.S. Application Data

[63] Continuation of Ser. No. 874,482, Apr. 27, 1992, abandoned.

[51] Int. Cl.⁶ .............................. H02M 7/538
[52] U.S. Cl. ...................... 363/133; 363/23; 363/97; 363/124; 323/266
[58] Field of Search ............. 323/222, 232, 266, 272, 323/282; 363/22, 23, 24, 25, 26, 65, 71, 97, 133, 134

[56] References Cited

U.S. PATENT DOCUMENTS

| | | | |
|---|---|---|---|
| 3,742,330 | 6/1973 | Hodges et al. | 323/266 |
| 4,034,280 | 7/1977 | Cronin et al. | 363/97 |
| 4,095,128 | 6/1978 | Tanigaki | 307/254 |
| 4,251,857 | 2/1981 | Shelly | 363/124 |
| 4,661,896 | 4/1987 | Kobayashi et al. | 323/266 |
| 4,725,768 | 2/1988 | Watanabe | 323/222 |
| 4,905,136 | 2/1990 | Tanaka | 363/124 |
| 5,070,439 | 12/1991 | Remson | 363/22 |
| 5,138,249 | 8/1992 | Capel | 363/124 |
| 5,162,981 | 11/1992 | Lazar et al. | 363/22 |

*Primary Examiner*—Jeffrey L. Sterrett
*Attorney, Agent, or Firm*—James Huffman; Jeff Hoop

[57] ABSTRACT

Synchronous switching inverter and regulator suppress rf emissions, and FET push-pull switching for the inverter provides high efficiency power transfer by sinusoidal transformer operation. Feedback control for both pass transistors switching and duty cycles insures overall synchronous behavior.

12 Claims, 18 Drawing Sheets

SYNCHRONOUSLY SWITCHING INVERTER AND REGULATOR

This is a continuation of application Ser. No. 07/874,482, filed Apr. 27, 1992, now abandoned.

PARTIAL WAIVER OF COPYRIGHT PURSUANT TO 1077 O.G. 22 (Mar. 20, 1987)

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to electronic devices, and, more particularly, to power supply and control as may used in portable computer systems.

Laptop and Smaller Computers

Portable personal computers were introduced in the early 1980s and proved to be very useful and popular. As this market has developed, it has become increasingly clear that users strongly desire systems to have small volume, small weight, physical durability, and long battery-powered lifetime. Thus, small portable computers ("laptop" computers) proved to be extremely popular during the late 1980s. Users continue to demand more features, longer time between battery recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Approaches to Power Conservation

There are basic approaches to extending the operating lifetime of a portable computer. The simplest way is to specify components at the lowest economical power consumption. Thus, for instance, CMOS integrated circuits and liquid crystal displays (LCDs) will normally be used.

An equally simple way is to increase battery capacity. However, both of these routes rapidly encounter limits, which are set simply by the tradeoff of the cost of lower-power components, or of the elimination of functionality, with user expectations.

Another approach focusses on the conversion efficiency of the battery power to the regulated AC and DC power actually consumed by the computer components.

And a fourth way invokes power-management algorithms so that, at almost every instant, all components are being operated in the lowest-power mode for their current demands. Thus, for example, a processor which is not currently executing a program may be placed into "sleep" mode, to reduce its overall power consumption. For another example, substantial power savings can be achieved simply by stopping the system clock. For another example, it is common practice, in portable computers with an LCD display, to provide backlighting for use of the display under low-light conditions. Because this backlighting consumes relatively large amounts of power, it will normally be turned off after a short period of inactivity (or even, alternatively, after a short duration regardless of activity), until the user again demands backlighting.

All of these lines of approach have some inherent limits. For example, it is hard to foresee any integrated circuit technology which would be economical in the 1990s and more power-efficient than low-power low-voltage CMOS. Some further improvement in this area is foreseeable, but no revolutionary improvements appear likely. Moreover, in practice, such improvements are largely outside the control of system designers: when lower-power chips are sampled, system design houses will buy them; but system design houses cannot greatly accelerate the pace of introduction of such chips.

It is also true that the smartest power-management programs cannot reduce the time fraction during which the user wishes to look at the display, or enter data through the keyboard. However, in this area there does appear to be room for improvement, and system design improvements can help achieve power efficiency.

Many power management schemes have been proposed, where parts of the system are shut down during periods of inactivity. These approaches tend to extend the usable working time between recharges.

In addition, it has been recognized that management of the charging and discharging cycles of Ni-Cd or NiMH$_4$ batteries can help to extend their life.

Either of these power-management functions requires some intelligent control. The conventional way to implement this has been using the main microprocessor (CPU). To accomplish this, the necessary program steps are inserted into the BIOS software (basic input/output system software), which is stored in ROM.

Display Power Consumption

FIG. 1 illustrates in perspective view a notebook type portable computer system labelled with reference numeral 100. System 100 typically has a seven volt main battery made of six 1.2 volt rechargeable nickel-cadmium cells in series and a battery power manager for supplying the various power needs, such as 5 volts regulated DC, 12 volts regulated DC, and high voltage AC to power the backlighting for the display. The display typically utilizes reflective transmissive or transflective technology to achieve brightness and contrast. Both transmissive and transflective displays employ some form of backlighting. Cold cathode fluorescent lamps (CCFL) provide the highest available efficiency for illumination of the display. The backlighting of the display typically consumes about half of the battery life for a notebook type portable computer and thus the efficiency of the backlighting greatly impacts battery life.

A CCFL requires high voltage AC to operate: about 1500 volts to strike the arc and about 300 volts to sustain it. Thus the power manager typically includes a DC to AC inverter which may be of the type shown schematically in FIG. 2. In addition to high efficiency (for long battery life), the inverter should deliver a sinusoidal lamp drive current to minimize RF emissions. However, known low voltage inverters only achieve efficiencies of 80% or less and also need component changes to accommodate variant CCFL configurations such as additional parallel or series lamps. Inverters based on silicon controlled rectifiers (SCRs) provide higher efficiencies but other problems. Generally, see Pressman, Switching Power Supply Design (McGraw-Hill 1991).

Inverters

The prior art inverter of FIG. 2 operates as follows. Vin connects to a low voltage DC source, such as a battery at 7 volts, and pass FET Q1 together with freewheeling Schottky diode D1, inductor L1, plus capacitor C1 form a buck regulator to step Vin down to Vreg=Vin×the duty cycle of pass FET Q1. Pulse width modulator PWM samples the current through cold cathode fluorescent lamp CCFL-1 by tapping resistor R3 and uses this feedback to drive the gate of pass FET Q1 to control its duty cycle and thus the voltage delivered; the pulse frequency of PWM is selected high enough to permit L1-C1 to lowpass filter the output. The base-tied npn transistors Q2 and Q3 alternatively conduct current due to the positive feedback between increasing collector current and increasing base current by the inductive couplings of the three primary windings T1-P-1, T1-P-2, and T1-P-3 of transformer T1; this is essentially a Royer oscillator. In particular, if Q2 turns on with a small base current limited by resistor R1, then the collector current of Q2 will increase and the positive feedback from winding T1-P-1 to winding T1-P-3 will drive the base more positive (and the base of Q3 negative to keep Q3 turned off) and Q2 quickly turns fully on. Then Vreg appears mostly across winding T1-P-1 as the collector current ramps up. The core of transformer T1 may saturate as the collector current continues to increase. Now the gain ($\beta$) of Q2 is collector current dependent and decreases for large currents, so the rate of increase of the collector current peaks and the voltage drop across winding T1-P-1 falls with the collector voltage of Q2 increasing up to Vreg. The dropping of the rate of increase of the collector current implies a drop in the positive feedback to the base of Q2, and this feeds back on itself to quickly turn off Q2 and drop the collector current. Thus the flux in tramformer T1 collapses (with circulating current through capacitor C2), which induces a negative bias at the base of Q2 but a positive bias at the base of Q3 to turn on Q3. And the increasing collector current through winding T1-P-2 will provide positive feedback to winding T1-P-3 to fully turn on Q3 analogous to the positive feedback for Q2 previously described. Again, the fi fall off will decrease the rate of collector current increase and the consequent drop in positive feedback will turn off Q3. And the turn off of Q3 analogously turns on Q2.

The windings T1-P-1 and T1-P-2 in transformer T1 have opposite orientations, so the secondary current through T1-S changes direction when Q3 turns on and Q2 turns off. The ratio of the number of turns in one of the primary windings carrying a collector current to the number of turns in the second winding together with the magnitude of Vreg determines the magnitude of the induced secondary voltage which applied across cold cathode fluorescent lamp CCFL-1. Thus to generate 1500 volts (with zero current) in the secondary and with a Vreg of about 5 volts in the primary, the winding ratio should be about 300 to 1 for secondary to primary. Capacitor C3 is much larger than the capacitance of CCFL-1 when CCFL-1 is not conducting, so the 1500 volts appear essentially across CCFL-1. Once CCFL-1 sustains an arc and provides only a 200-300 volt drop, capacitor C3 (plus the secondary winding resistance) provides the impedance for the remaining 1200-1300 volt drop in the secondary circuit.

Resistors R5, R3, and R4, diodes D2 and D3, and capacitor C4 provide a sampling of the CCFL current for feedback to pulse width modulator PWM. Indeed, diode D2 charges up capacitor C4 to the peak positive voltage across resistor R5, and resistors R3 and R4 provide a small leakage current from capacitor C4 and also provide a tap to pulse width modulator PWM. If the voltage in the secondary circuit is too high, then pulse width modulator PWM will lower the duty cycle of pass FET Q1 and thereby lower Vreg which implies smaller collector currents and thus smaller secondary voltage.

Inverters such as in FIG. 2 typically have optimized switching transistor drive over the Vin range of operation. A problem with this approach lies with the regenerative base drive scheme and the use of bipolar transistors. Bipolar transistors require base drive current to be consumed from the feedback winding causing power losses. While these losses can be minimized at one particular input voltage, they begin to increase as Vin deviates from the optimization level. As Vin increases so does the base current thereby causing additional power consumption. With a constant power load as with the typical CCFL, the collector current decreases as Vin increases, therefore less base current can support the collector current. As Vin decreases from the optimization level the collector current increases to maintain a constant power load, and the base drive decreases. This decrease in base drive causes the switching transistors to incur additional saturation losses and lower system efficiency.

Such a base drive scheme limits the dynamic range of the input voltage Vin, and the need to carefully tune the transformers to the load. This tuning requirement limits the inverter's ability to accommodate different CCFL lamp types and configurations.

Features

The present invention provides an inverter for CCFL driving which includes logical switching of field effect transistors, nonsaturating transformers, plus a resonant LC circuit to achieve 90% efficiencies and can accommodate CCFLs in single or dual configurations without a change in circuit components.

BRIEF DESCRIPTION OF THE DRAWINGS

The present invention will be described with reference to the accompanying drawings, which are schematic for clarity.

DESCRIPTION OF THE PREFERRED EMBODIMENTS

Overview

Figure 1:
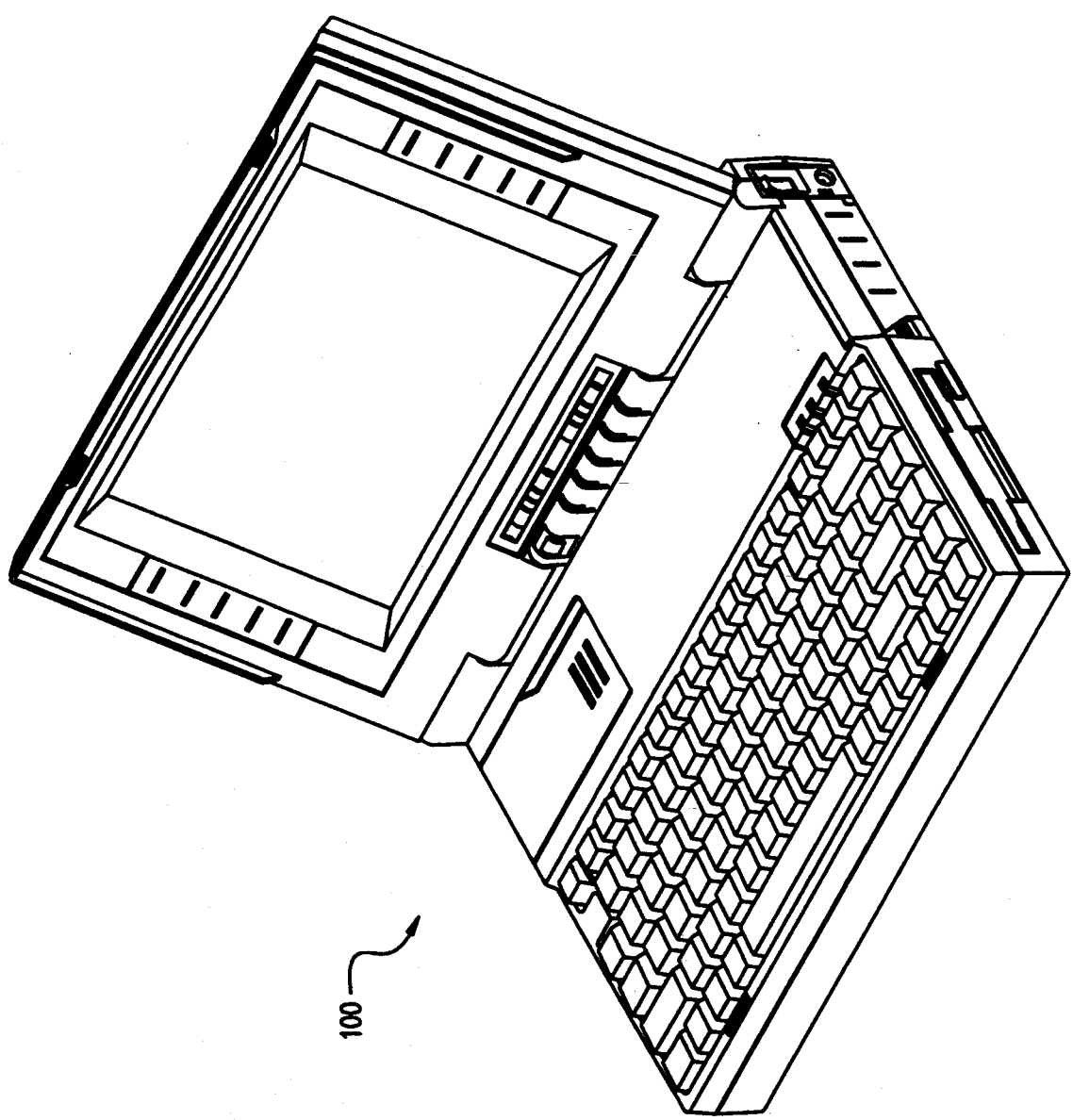
FIG. 1 perspectively illustrates a laptop computer.
Figure 2:
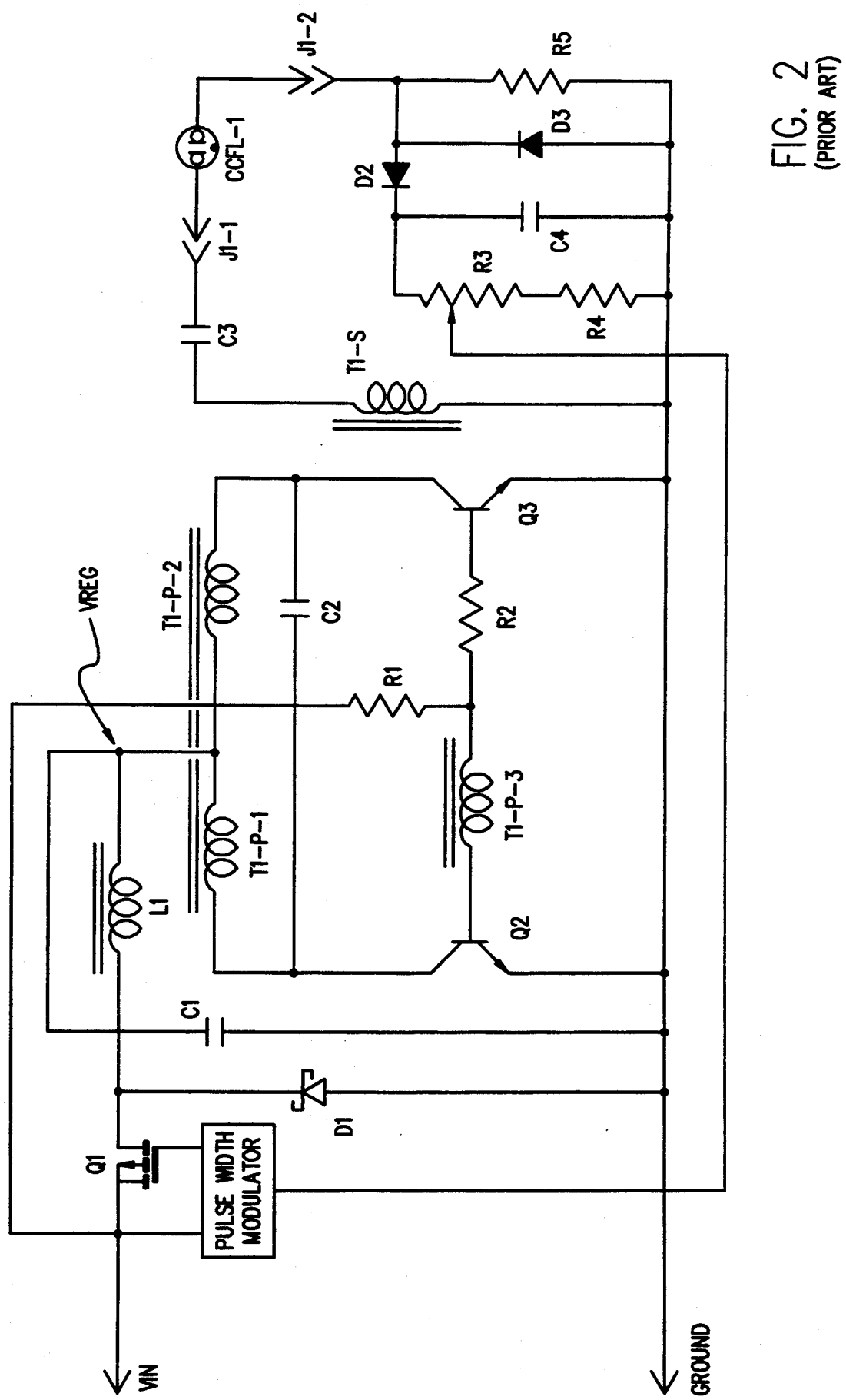
FIG. 2 schematically shows a known gain-limited switching inverter.
Figure 3A:
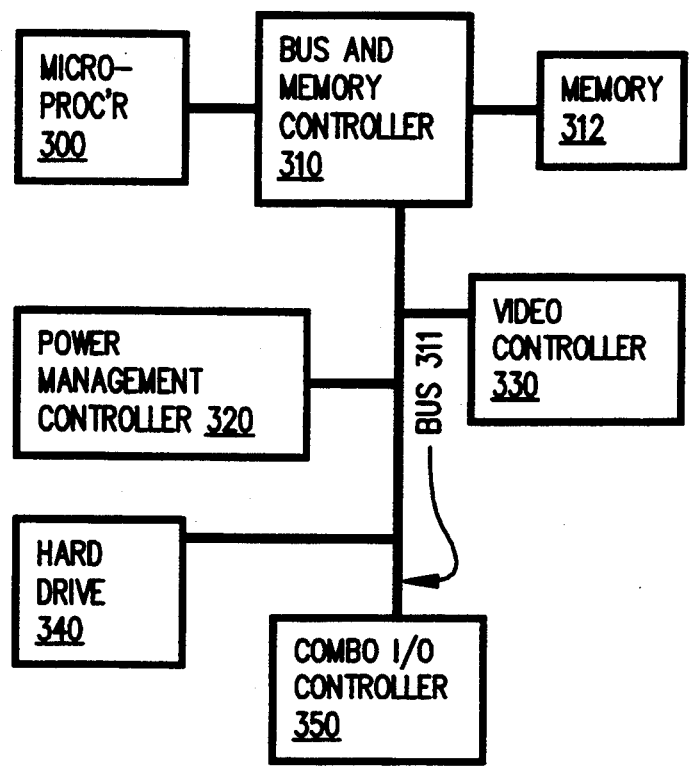
FIGS. 3A-E are schematic circuit block diagrams of a first preferred embodiment system.

FIG. 3A is a schematic block diagram of a first preferred embodiment portable computer system which includes microprocessor 300, bus and memory controller 310, bus 311, memory 312, power consumption management 320, video controller 330, hard disk drive 340, and input/output controller 350.

Figure 3B:
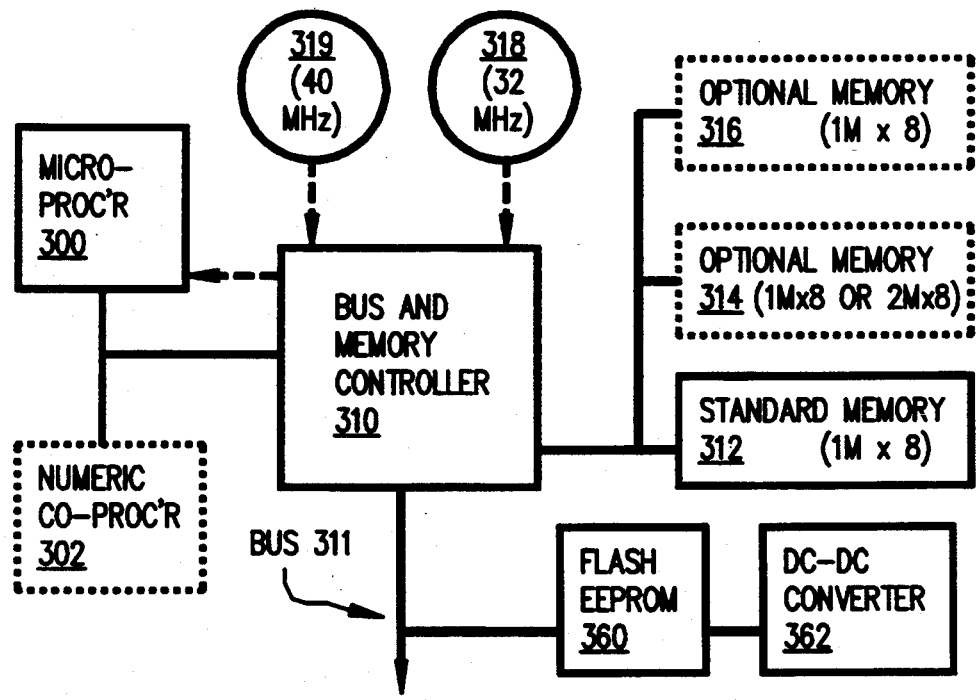
Figure 3C:
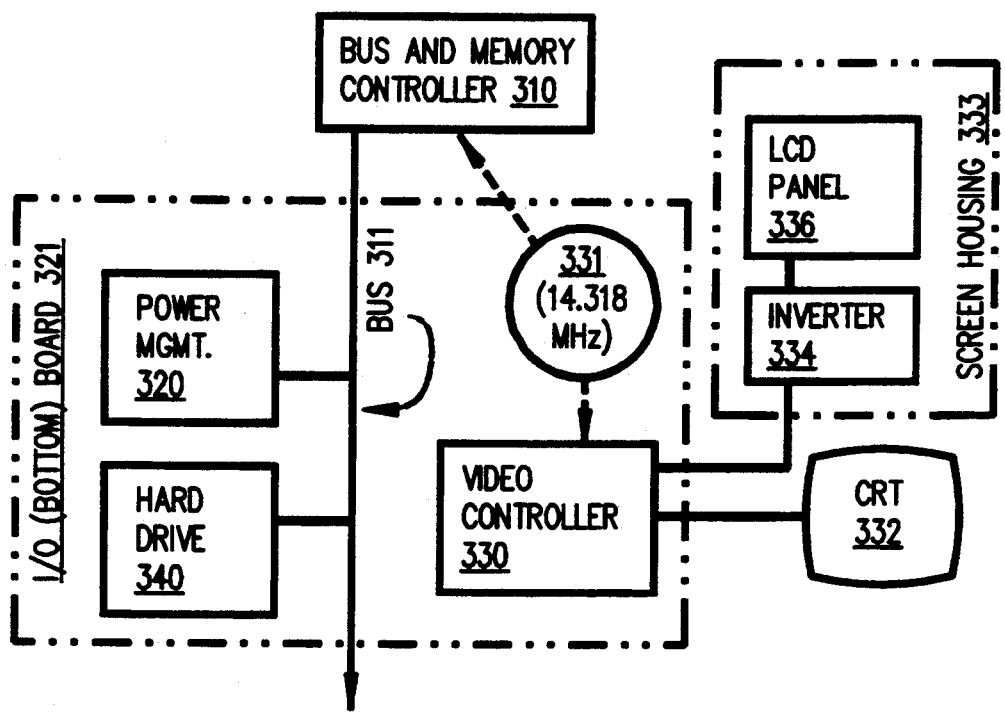
Figure 3D:
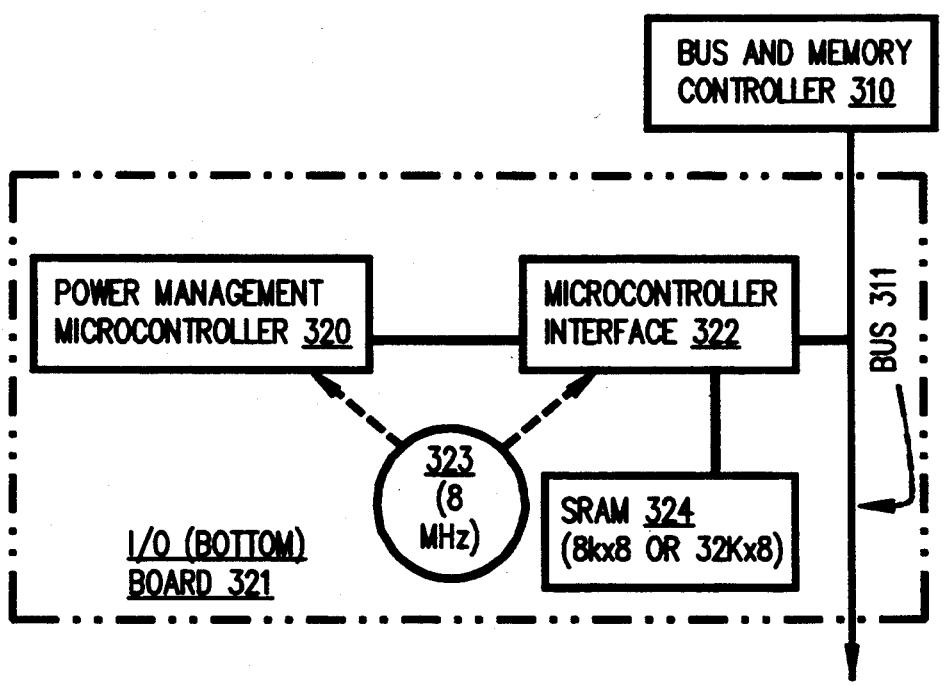
Figure 3E:
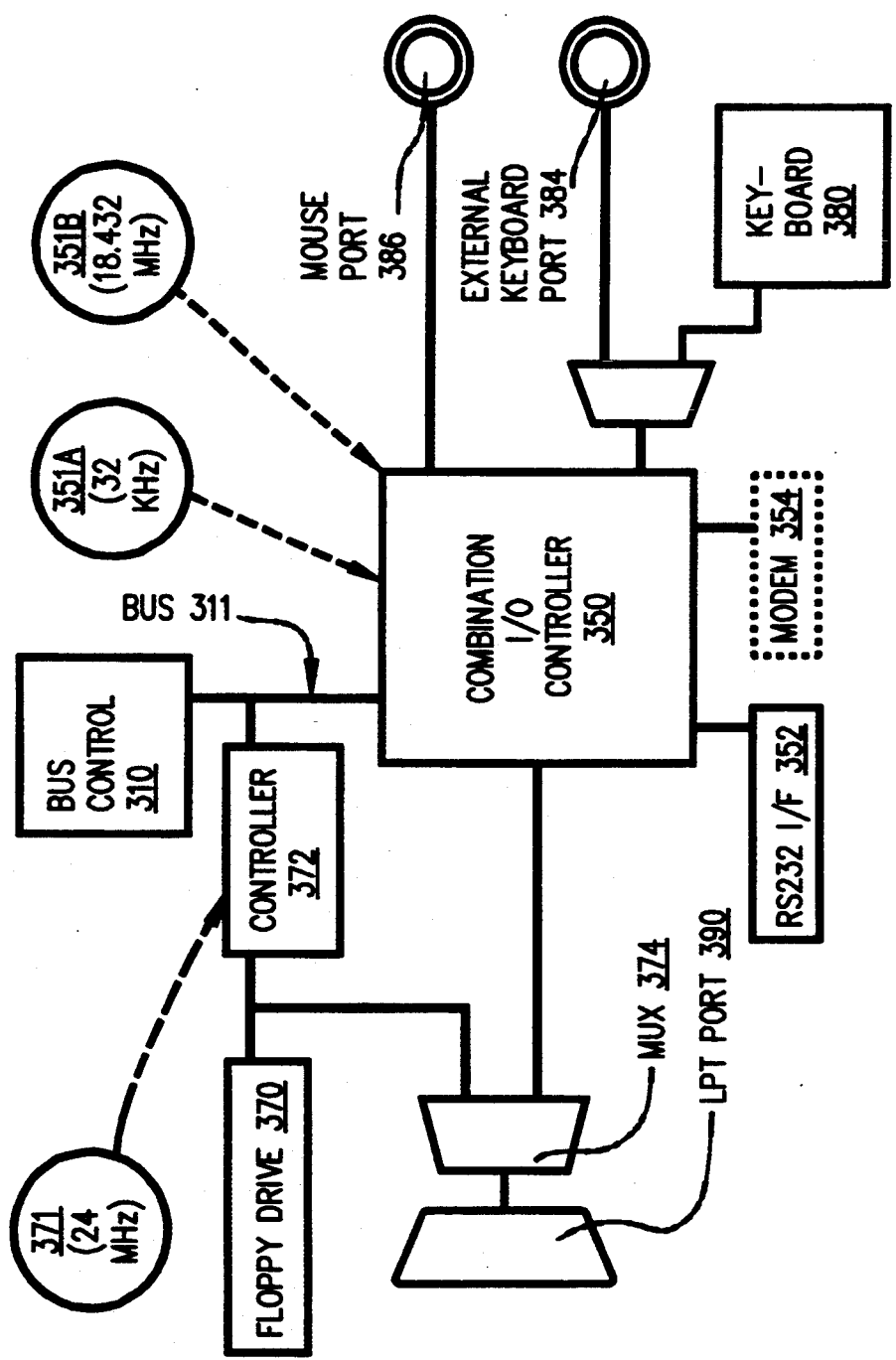
Figure 4A:
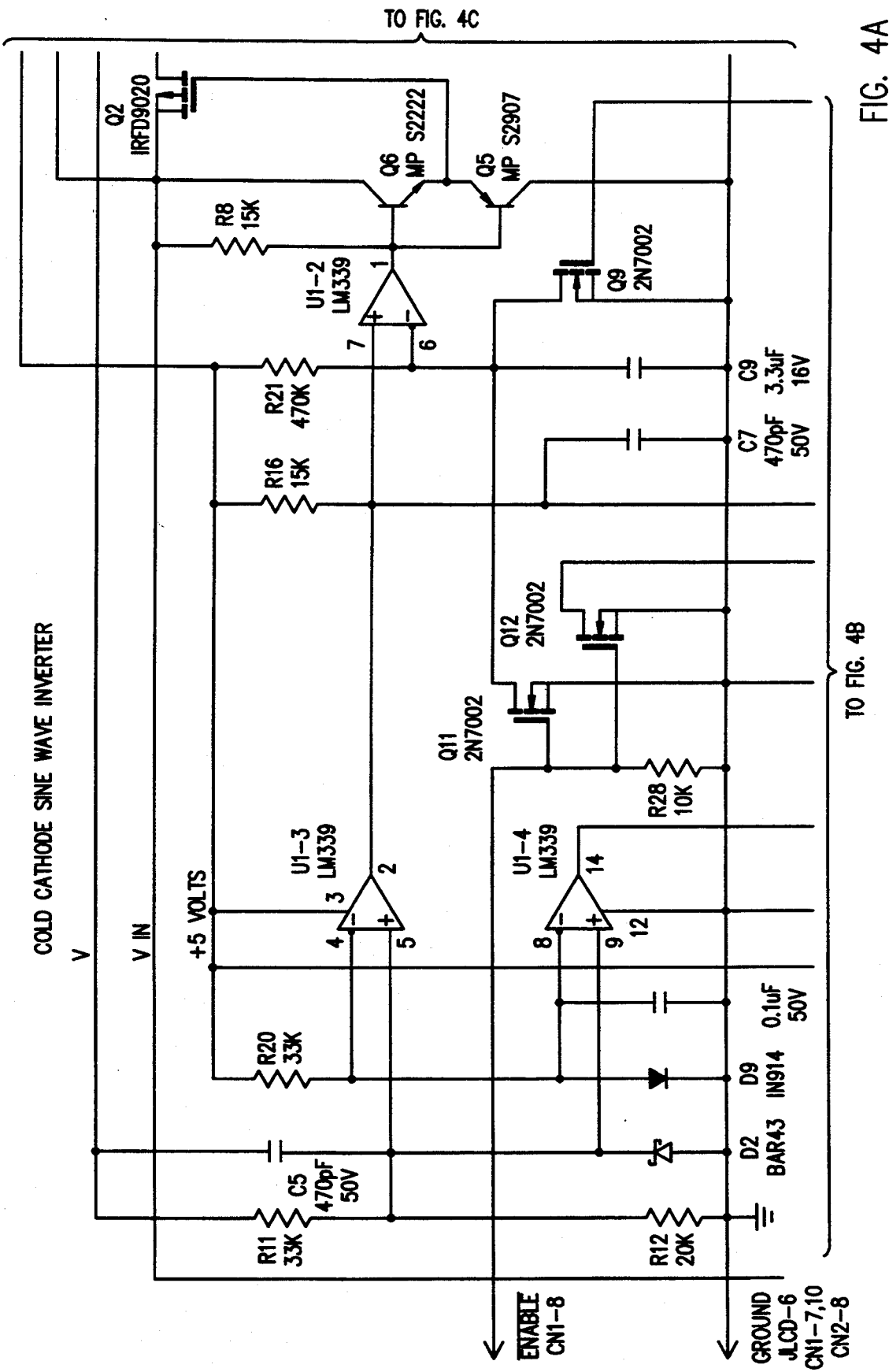
FIGS. 4A-D are schematic circuit diagrams of the first preferred embodiment inverter.
Figure 4B:
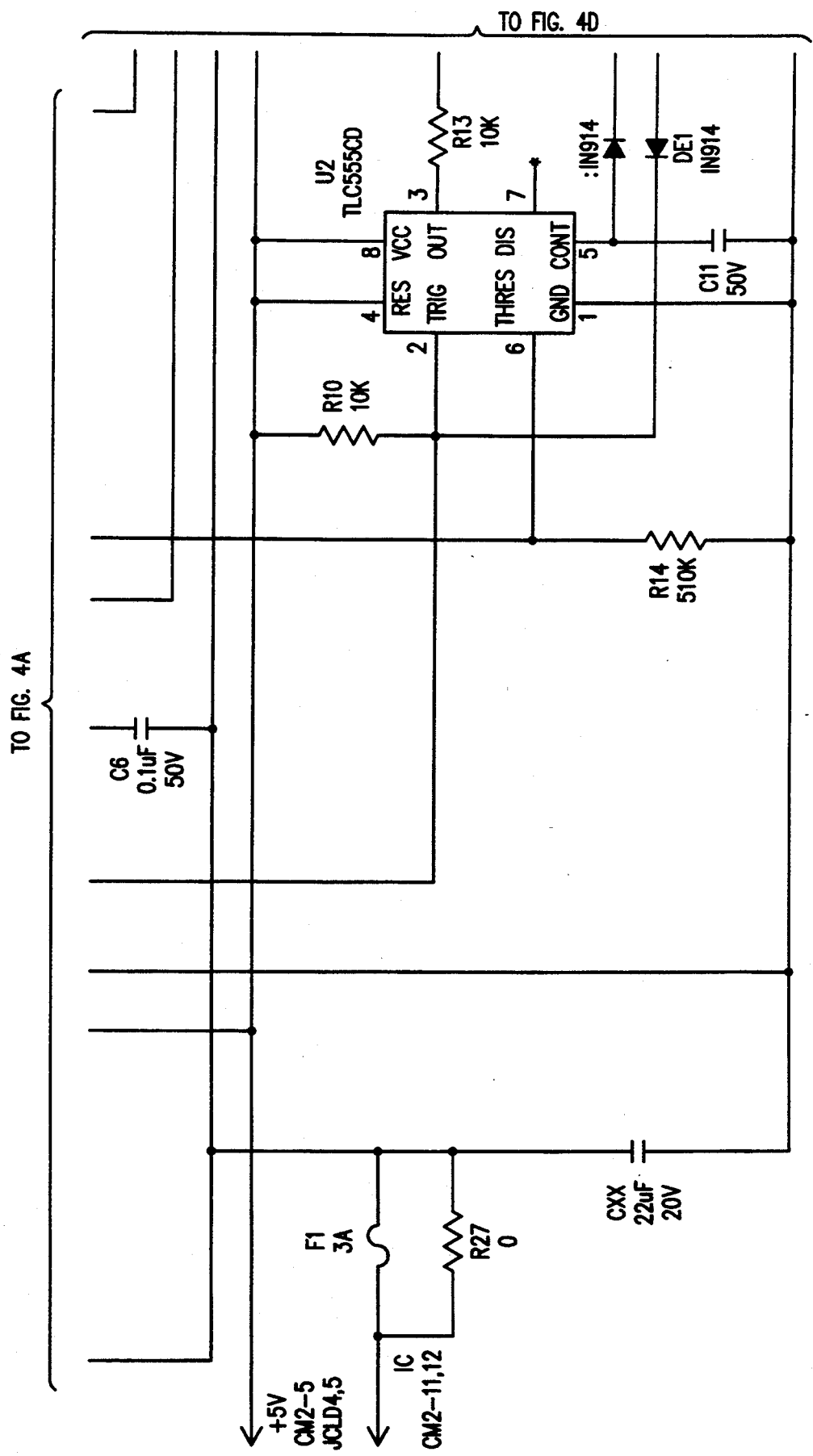
Figure 4C:
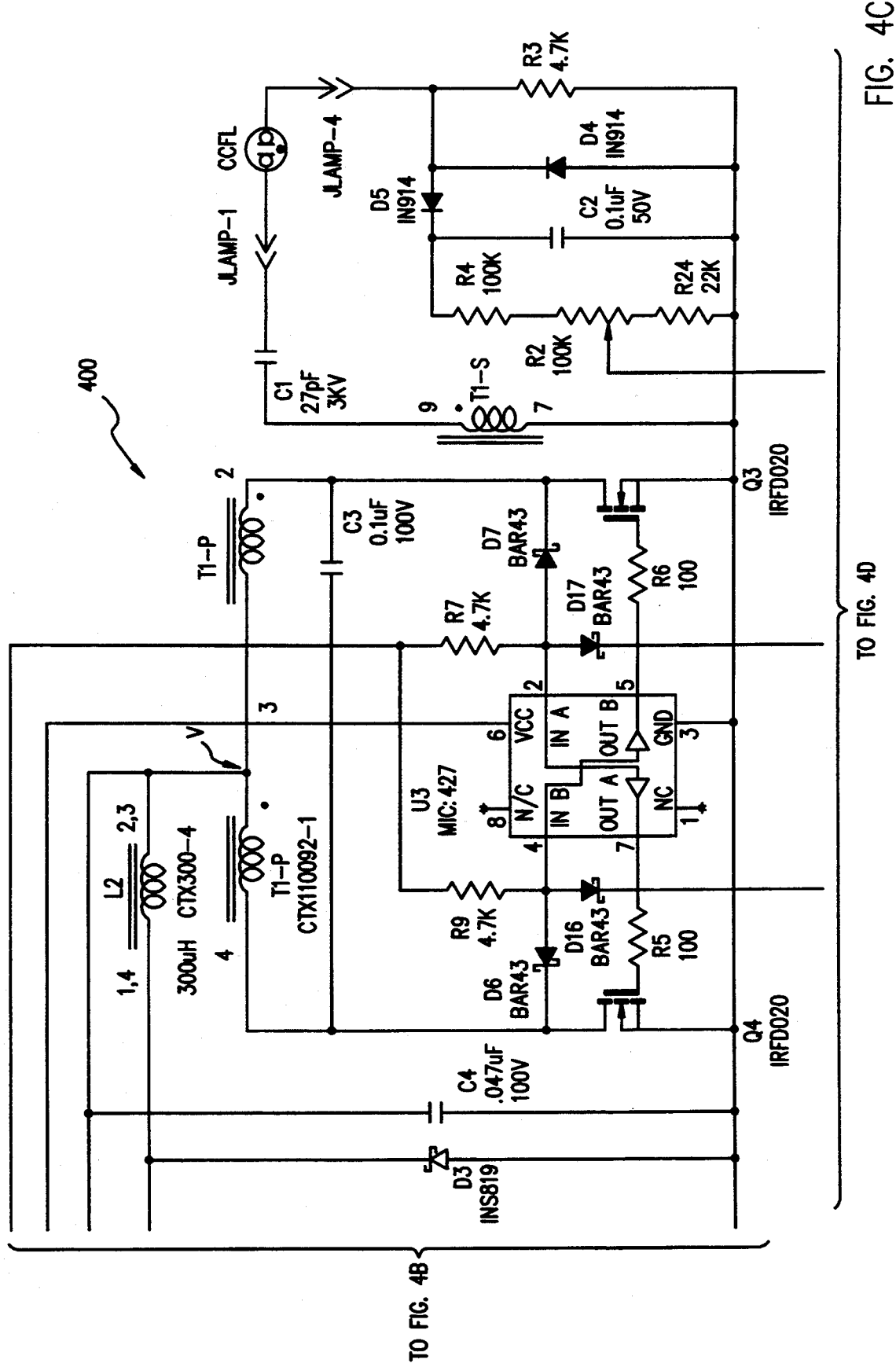
Figure 4D:
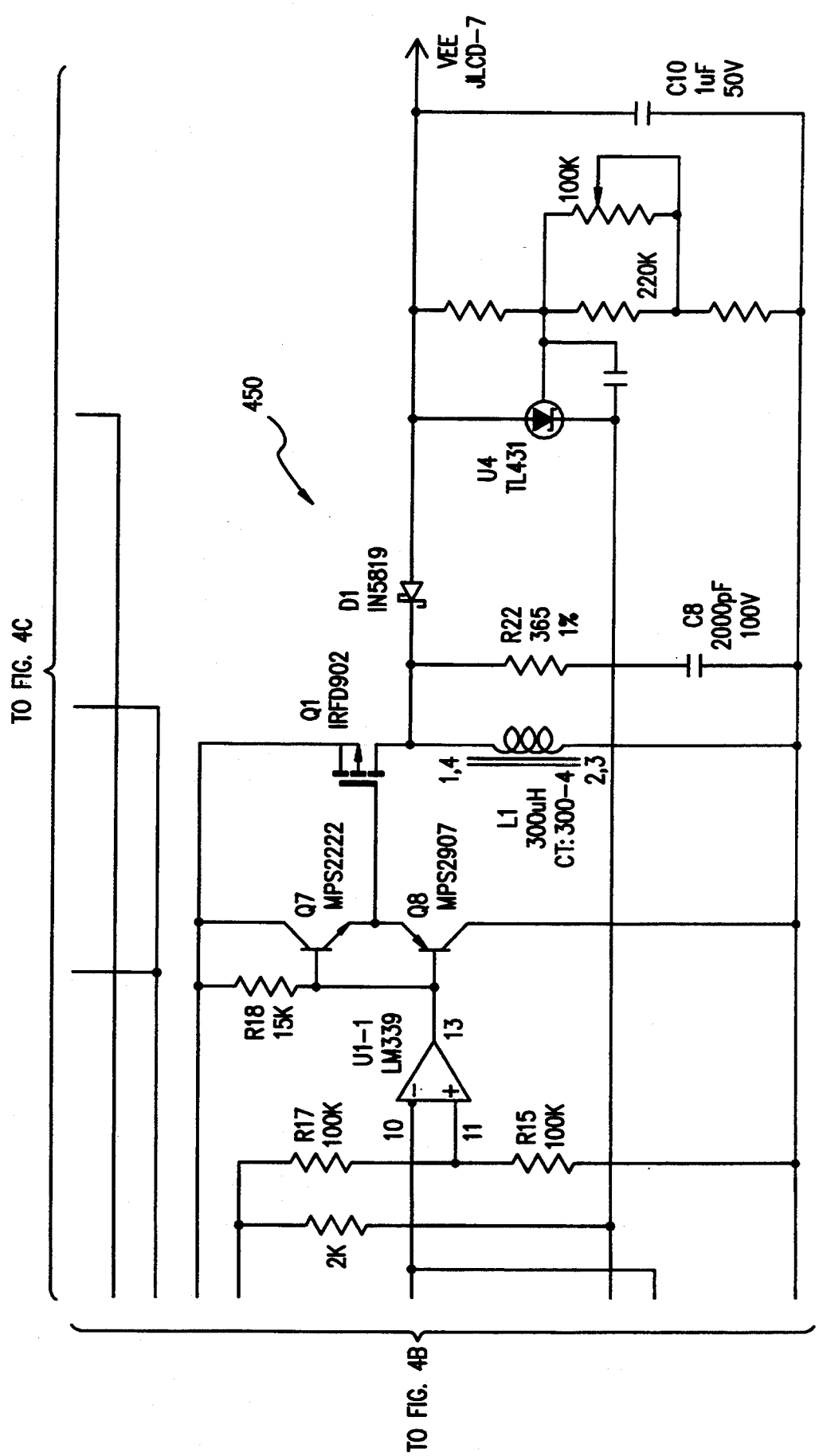

FIGS. 3B–E show more detailed portions of FIG. 3A. In particular, FIG. 3B illustrates memory expansion with optional 1 or 2 megabyte modules 316 and 314 plus DC-DC converter 362 that takes input power from the rechargeable battery at about 6 volts (five 1.2 volt NiCd or NiMH$_4$ cells) and outputs 12 volts for programming Flash EEPROM 360 which contains the boot program. FIG. 3C shows LCD panel 336 and first preferred embodiment inverter 334 which provides the AC power for the backlighting of panel 336. Inverter 334 schematically appears in FIG. 4. FIG. 3D illustrates further aspects of power consumption management controller 320, and FIG. 3E shows connections to input/output controller 350 such as keyboard 380, mouse port 386, RS 232 interface 352, optional modem 354, and printer port 390.

Inverter

FIG. 4 schematically shows a first preferred inverter, generally labelled with reference numeral 400, plus a polarity inverting regulator for generation of a negative Vee level, generally labelled with reference numeral 450. Inverter 400 and regulator 450 both derive power from an unregulated battery at voltage Vin (about 6 volts but may be much higher) connected to terminal TC and fuse F1 shown in the lower lefthand edge of FIG. 4; inverter 400 delivers ac power to cold cathode fluorescent lamp CCFL through transformer T1, and regulator 450 delivers power at terminal VEE at about −11 to −30 volts. A low power regulated supply at +5 volts and labelled +5 V shown in the center lefthand edge of FIG. 4 provides various bias and chip power. Inverter 400 basically consists of switching n-channel FETs Q3 and Q4 in a resonant circuit formed by inductor L2 and capacitor C3 plus transformer reflected capacitance. Transformer T1 transfers power to the CCFL secondary circuit. The buck-regulator-looking circuit portion made of p-channel pass FET Q2, inductor L2, free-wheeling diode D3, capacitor C4, and pulse width modulation controlled by comparator U1-2 provides the power control by feedback from the CCFL secondary circuit but does not provide a regulated voltage to transformer T1 because the LC filter of inductor L2 and capacitor C4 has too high a cutoff frequency. The feedback from the current sensor in the CCFL secondary circuit made of resistor R3, capacitor C2, diodes D4 and D5, and adjustable voltage divider R2-R4-R24 drives comparator U 1-2. A more detailed explanation follows.

Inverting Regulator

Regulator 450 is a polarity inverting switching regulator with p-channel pass FET Q1, inductor L1, diode D1, capacitor C10, and pulse width modulation by 555 timer U2 driving comparator U1-1 and emitter followers Q7-Q8 to control pass FET Q1. Feedback by a resistive voltage divider controlling Zener diode U4 to control the voltage at the CONTROL pin (pin 5) of 555 timer U2. Note that regulator 450 also synchronizes with inverter 400 because the voltage V at the center tap of the primaries of transformer T1 drives input 8 of comparator U 1-4 which feeds the trigger input of 555 timer U2. The synchronization of both power pass FETs Q1 and Q2 with tramformer T1 voltage lowers harmonic distortion and keeps noise in fixed patterns which are less distracting in a screen display.

Ideal Transformer Analysis

Figure 5:
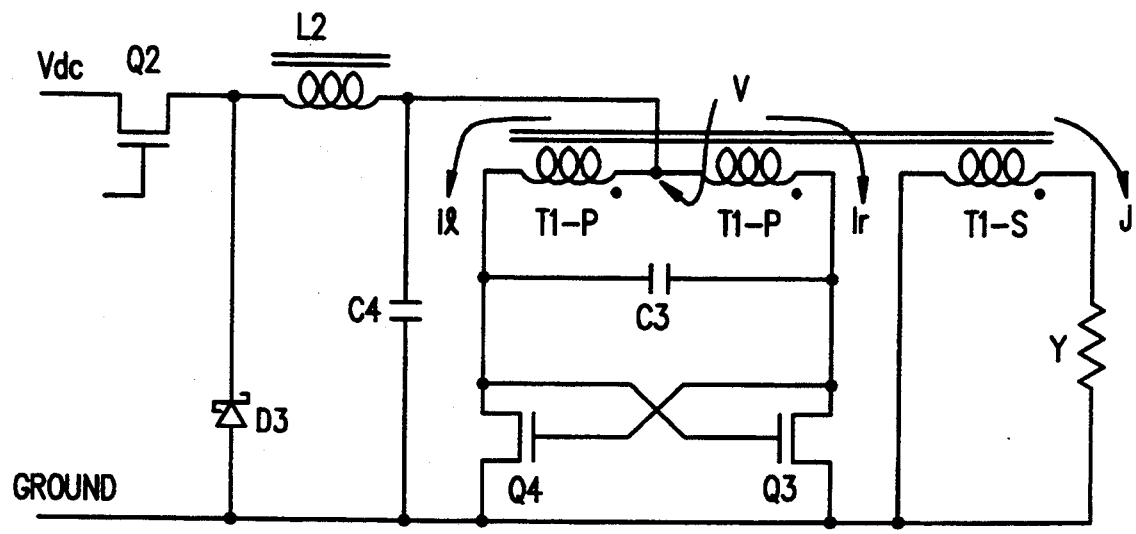
FIGS. 5-6 are models of the first preferred embodiment inverter.
Figure 6:
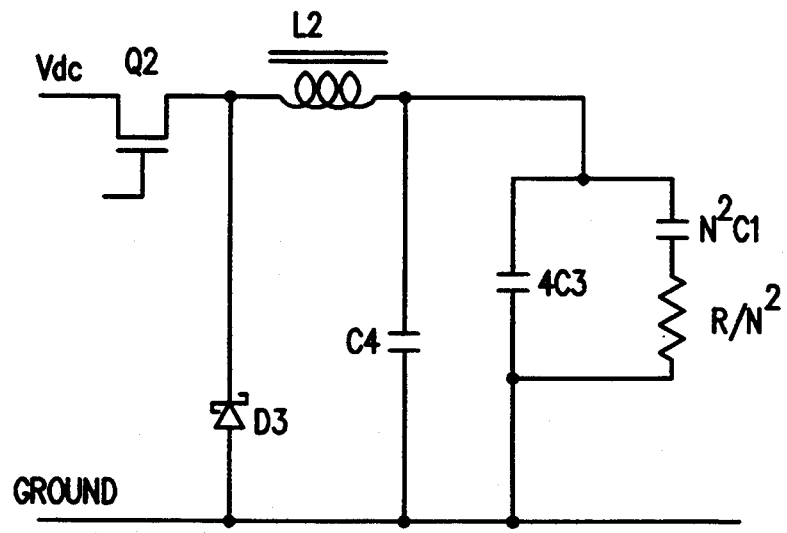

The buck-regulator-looking circuit portion of inverter 400 has output capacitor C4 which is too small (0.047 $\mu$F) for the 300 $\mu$H inductance of inductor L2 to provide regulated output at the center tap of the primaries of T1, and inverter 400 basically operates by resonantly ringing inductor L2 with capacitor C3 plus reflected capacitance as follows. First, consider a simplified version of the circuit as shown in FIG. 5; the buffer circuit U3 has been suppressed to clearly show the cross coupling of push-pull FETs Q3 and Q4, and the admittance in the secondary circuit including the lamp has been simply expressed as Y. The feedback from the secondary circuit to control the switching of pass FET Q2 has also been suppressed. Let V denote the voltage at the center tap of the primaries T1-P of transformer T1, N denote the ratio of turns in the secondary T1-S of T1 to either of the primaries of T1, and Il and Ir the currents as shown in the left and right primaries and J the secondary current. N equals 134 in transformer T1. As a first approximation take transformer T1 to be an ideal transformer. For an ideal tramformer the voltage across the secondary is N times the voltage across each primary and the orientation of the primaries implies a voltage of 2×V across capacitor C3 because one of Q3 and Q4 is turned on. Also, the constant flux in an ideal transformer implies a constant algebraic sum of the amp-turns in the windings; that is, Il=Ir+N×J. Thus the Fourier transforms of the currents Ir and J are simply 2×V×j×$\omega$×C3 and N×V×Y, so Il($\omega$)=2×V($\omega$)×j×$\omega$×C3+N$^2$×V($\omega$)×Y. The Fourier transform of the total current Il+Ir through the primaries of T1 is thus 4×V($\omega$)×j×$\omega$×C3+N$^2$V($\omega$)×Y which equals V($\omega$)×[j×$\omega$×4×C3+N$^2$×Y]. This indicates the effective admittance between the end of inductor L2 and ground is capacitor C4 in parallel with a capacitor 4×C3 plus an admittance N$^2$×Y as illustrated in FIG. 6. Now C4 is 0.047 $\mu$F and C3 is 0.1 $\mu$F, so C4 is small with respect to 4×C3 (and justifies the prior comment about C4 being too small to hold V constant as would be the case of a buck regulator). Lamp CCFL may be very roughly modelled as a 100–200 Kohm resistor in parallel with some reactance when an arc exists and as a small capacitor (less than 2 pF) when no arc exists. With no arc the voltage across CCFL is essentially N×V because capacitor C1 has a much large capacitance than CCFL, and this voltage will peak close to 1500 volts due to V swinging up to 11–12 volts and the ratio of turns N being about 134. 1500 volts typically suffice to strike the arc in CCFL and a 300 volt drop sustains it. During operation with an arc sustained in CCFL, Y may be taken as the admittance of a roughly 100–200 Kohm resistor in series with 27 pF capacitor C1 because the current sensing circuit presents at most 4.7 Kohms resistance.

FIG. 6 shows the effective circuit with arc-sustaining CCFL plus the current sensing circuit represented as resistor R. R/N$^2$ is roughly 5–10 ohms and will be seen to be negligible. C1 equals 27 pF, so N$^2$×C1 is about 0.5 $\mu$F and about equal to the parallel 4×C3. Inductor L2 is 300 $\mu$H, and so the LC circuit will ring at roughly 10

KHz which means the reactance of $N^2 \times C1$ is about 34 ohms and $R/N^2$ may be neglected for qualitative estimation. Push-pull switching by FETs Q3 and Q4 insures the sinusoidal operation of transformer T1 by changing polarity, and Vin provides the power. Note that the switching by and Q4 is synchronous with V because of the cross coupling. Also, as described below, the oscillations of V drive the switching of pass FET Q2, so this also is synchronous. And as previously noted, the oscillations of V drive the switching of pass FET Q1 of inverting regulator 450. The synchrony of the switchings limits the spectrum of generated noise.

Waveforms

Figure 7:
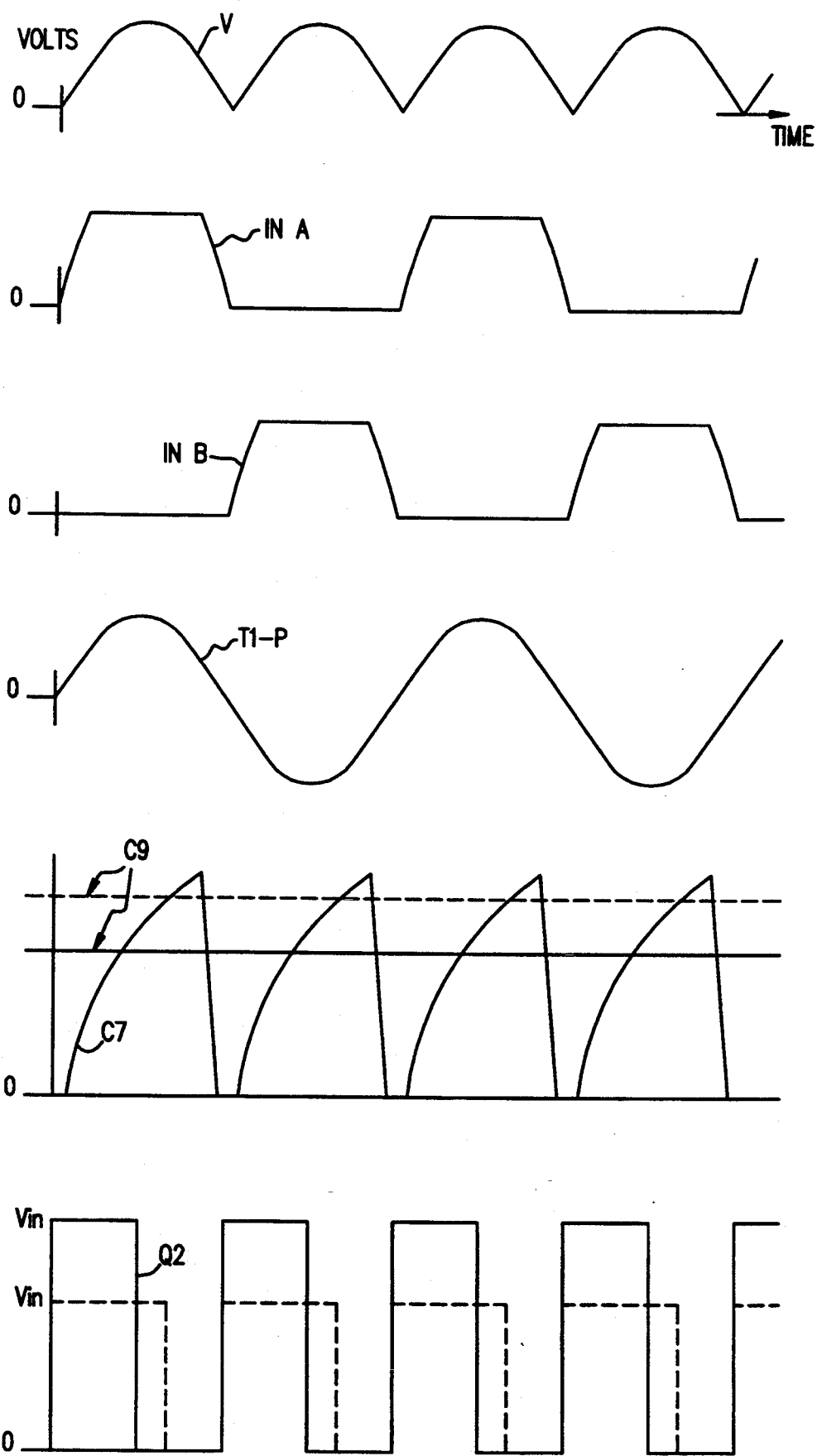
FIG. 7 shows waveforms.

FIG. 7 illustrates the voltage waveforms observed in inverter 400. The first panel shows the voltage V at the center tap (tap 3 in FIG. 4) of the primaries of transformer T1, the second panel shows the voltage at input 2 (IN A) of buffer circuit U3, the third panel shows the voltage a input 4 (IN B), the fourth panel is the voltage across each of the primaries of T1, the fifth panel illustrates the voltage ramping of capacitor C7, and the bottom panel indicates the voltage at the output of pass FET Q2 (and input of inductor L2) for two different levels of Vin and consequent duty cycles which both provide the same output to CCFL. Note that the tops of the waves in the second and third panels are cut off by the +5 volts supply. Also, the nearly pure sinusold operation of transformer T1 implies high efficiency in power transfer to CCFL with minimal saturation losses and harmonic generation.

The push-pull switching of Q3 and Q4 arises as follows. First, consider the situation of Q4 turned on and Q3 turned off; this corresponds to the first half ring period of the waveforms in the lefthand portion of FIG. 7. Now, the voltage at input 2 of U3 falling to zero at the end of the first half ring period turns off Q4 so that both Q3 and Q4 are momentarily off. +5 volts through resistors R7 and R9 pulls up both input 2 and input 4; however, the primary inductance of T1 causes a negative overshoot in the falling voltage at input 2, so Q3 turns on first and this holds Q4 off. That is, the overshoot insures push-pull switching. And push-pull switching of Q3 and Q4 means the polarity in T1 reverses each half ring period. That is, the T1 has sinusoidal activity (panel four of FIG. 7), even though pass FET Q2 pulses inductor L2 every half ring period and keeps V nonnegative (first panel of FIG. 7). The resonant character of the oscillation implies the current and voltage are roughly in phase, so the switching of FETs Q3 and Q4 occurs at a zero current plus zero voltage condition which eliminates Miller effect losses. This permits the use of resistors R5 and R6 as large as 100 ohms in the gate circuits of Q3 and Q4 to dampen ringing in these circuits.

Feedback

The switching of pass FET Q2 synchronizes with the oscillations of V, and feedback from the CCFL secondary circuit controls the duty cycle of pass FET Q2 as follows. First the switching. Inverter 400 has a voltage divider made of resistors R11 and R12 (upper lefthand edge of FIG. 4) which feeds 20/53 of voltage V to the positive input of comparator U 1-3 and the 0.7 volt drop across diode D9 feeds the negative input of U1-3. Thus comparator U1-3 will output current during the ring period of FIG. 7 until V drops to about 1.8 volts when it switches to sinking current and discharges capacitor C7. Capacitor C7 thus applies a low at input 7 of comparator U1-2 which, through emitter followers Q5-Q6, drives the gate of pass FET Q2 (a p-channel FET) low and thereby turns it on to apply Vin to inductor L2. This starts the next half ring period and V rises above 1.8 volts to switch comparator U1-3 back to high which begins a charging up of capacitor C7. Thus the voltage on capacitor C7 ramps up until discharged again. When the voltage on C7 reaches the voltage on capacitor C9, comparator U1-2 switches back to high and turns off pass FET Q2 for the remainder of the ring period; see the last two panels of FIG. 7.

The duty cycle of pass FET Q2 compensates for varying input Vin and also sets the maximum swing of V and thus the power delivered to lamp CCFL. The feedback from CCFL to control the duty cycle operates by controlling the voltage on capacitor C9 and thus the time that capacitor C7 takes to ramp up to equal the voltage on C9 and thereby switch comparator U1-2. Capacitor C9 feeds input 6 of comparator U1-2, and resistor R21 pulls up capacitor C9 while n-channel FET Q9 discharges C9. In the secondary circuit the current through resistor R3 provides a small voltage drop, and diodes D4 and D5 store the maximum positive swing of this small voltage on capacitor C2. Voltage divider R4-R2-R24 feeds about (adjustable) one tenth of the maximum positive (about 0.7 volt) to the gate of FET Q9 which bleeds charge from capacitor C9. Thus when the current through CCFL is too large, capacitor C2 stores too high a voltage and this turns on FET Q9 harder to more quickly bleed charge from capacitor C9 and lower the negative input to comparator U1-2. Hence, U1-2 switches high sooner during the voltage ramp up of capacitor C7 and thus turns off pass FET Q2 sooner and lowers the average current in L2. Thus with a shorter duty cycle for Q2, V does not swing as high and less power is transferred by transformer T1 to lamp CCFL. Conversely, if the current through lamp CCFL is too small, then the bias to the gate of FET Q9 is smaller and less charge bleeds off to raise the voltage on C9; consequently the duty cycle for Q2 increases so V swings higher and more power transfers to the secondary circuit.

The ENABLE# terminal (upper lefthand portion of FIG. 4) provides an enable control over inverter 400 and regulator 450. In particular, a high at ENABLE# turns on both Q11 and Q12. Q11 turned on discharges capacitor C9 so comparator U1-2 is always high and pass FET Q2 always off. Similarly, Q12 turned on implies a low (ground) at the cathods of diodes D16 and D17 which pulls the inputs to buffer drivers U3 down and turns off both switching FETs Q3 and Q4. Conversely, a low at ENABLE# turns off both Q11 and Q12 and permits oscillations as previously described.

Figure 8:
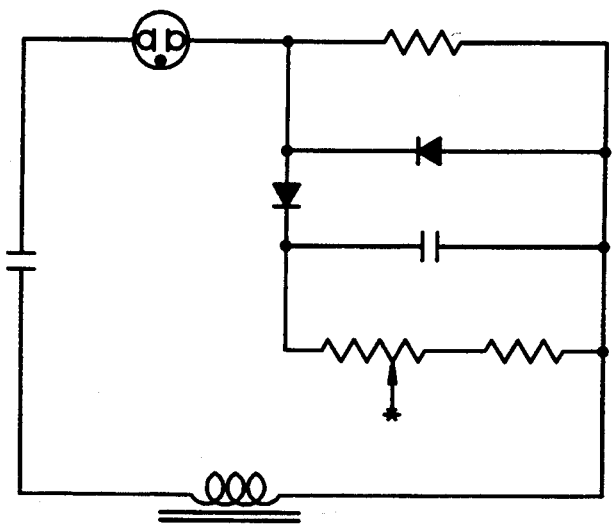
FIG. 8 illustrates alternative lamp connections.
Figure 8:
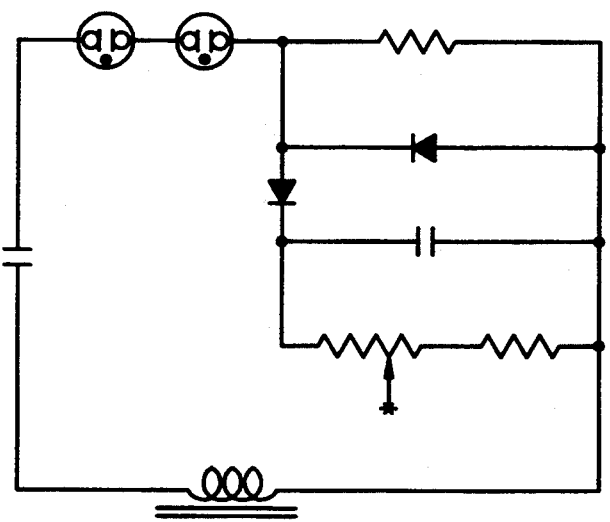
Figure 8:
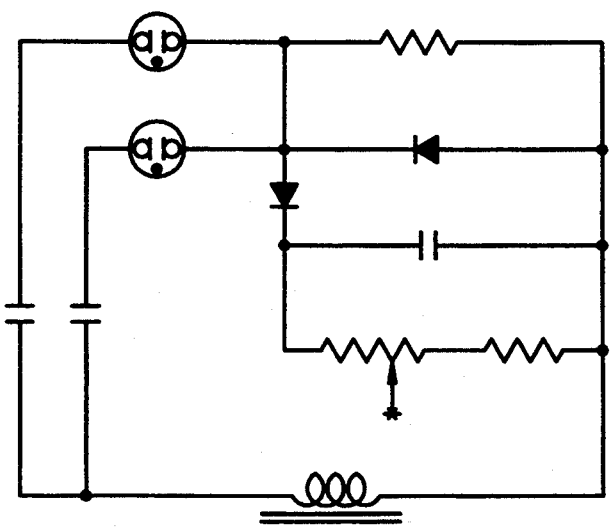
Figure 9A:
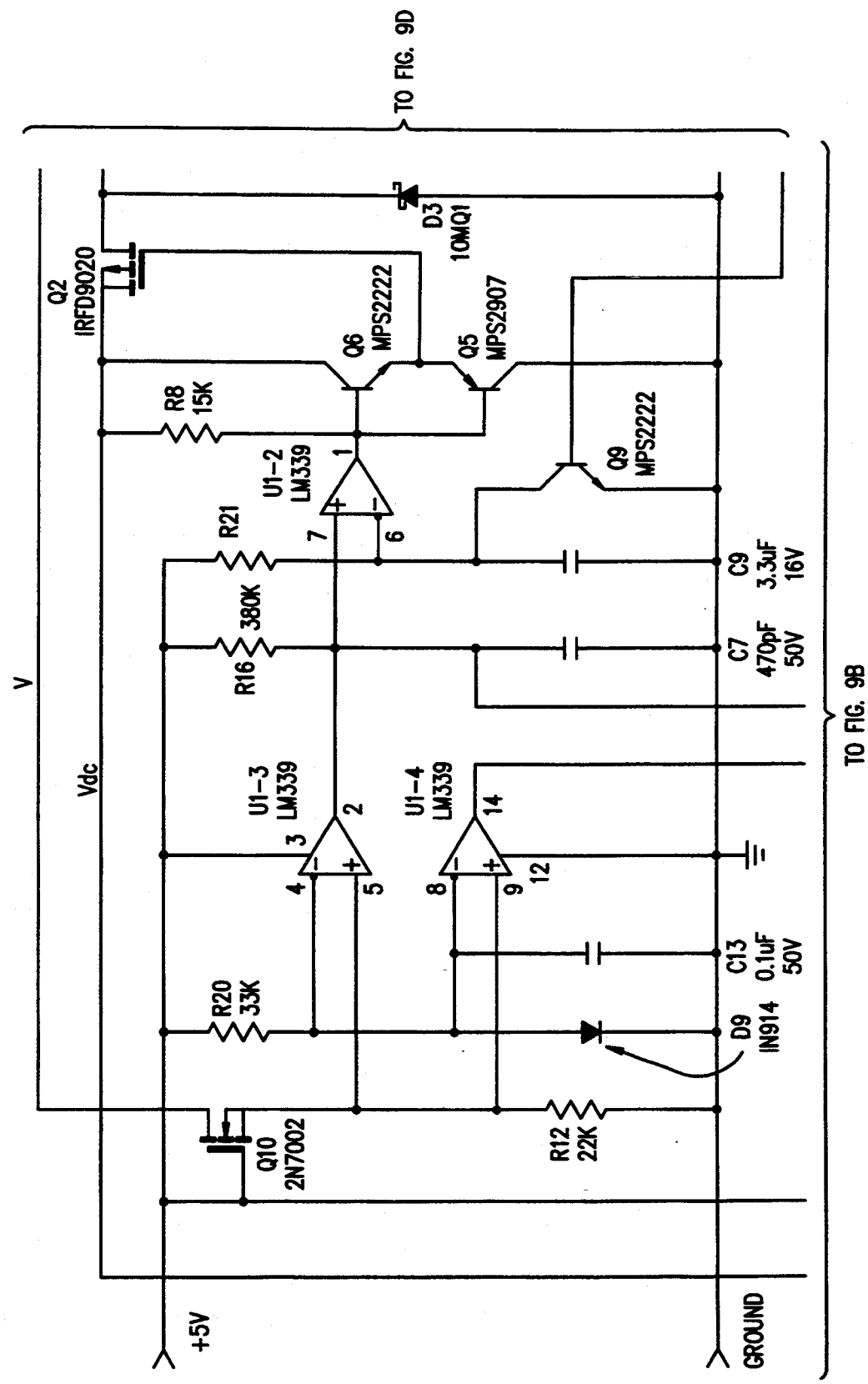
FIGS. 9A-D and 10A-B show other preferred embodiments.
Figure 9B:
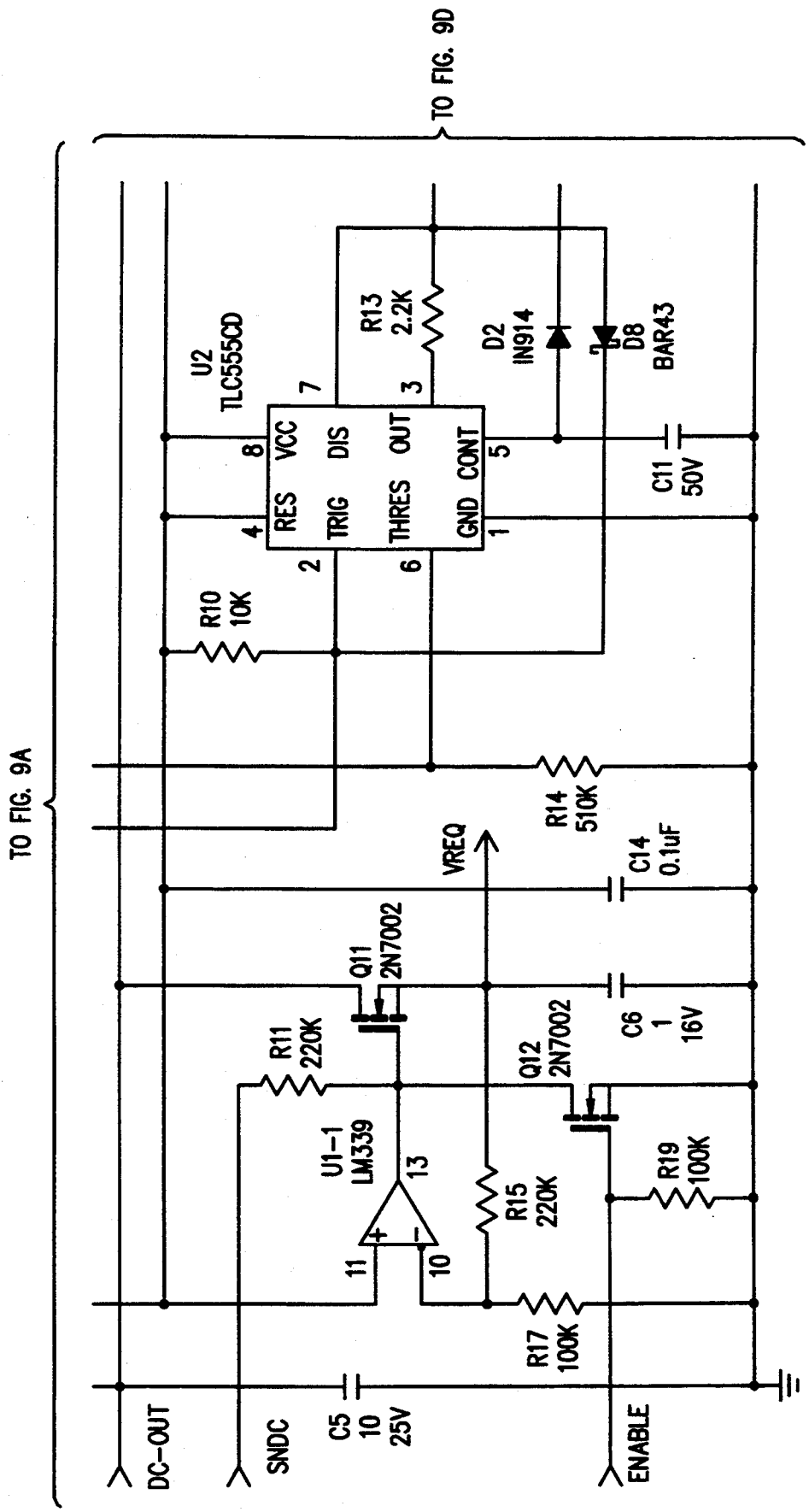
Figure 9C:
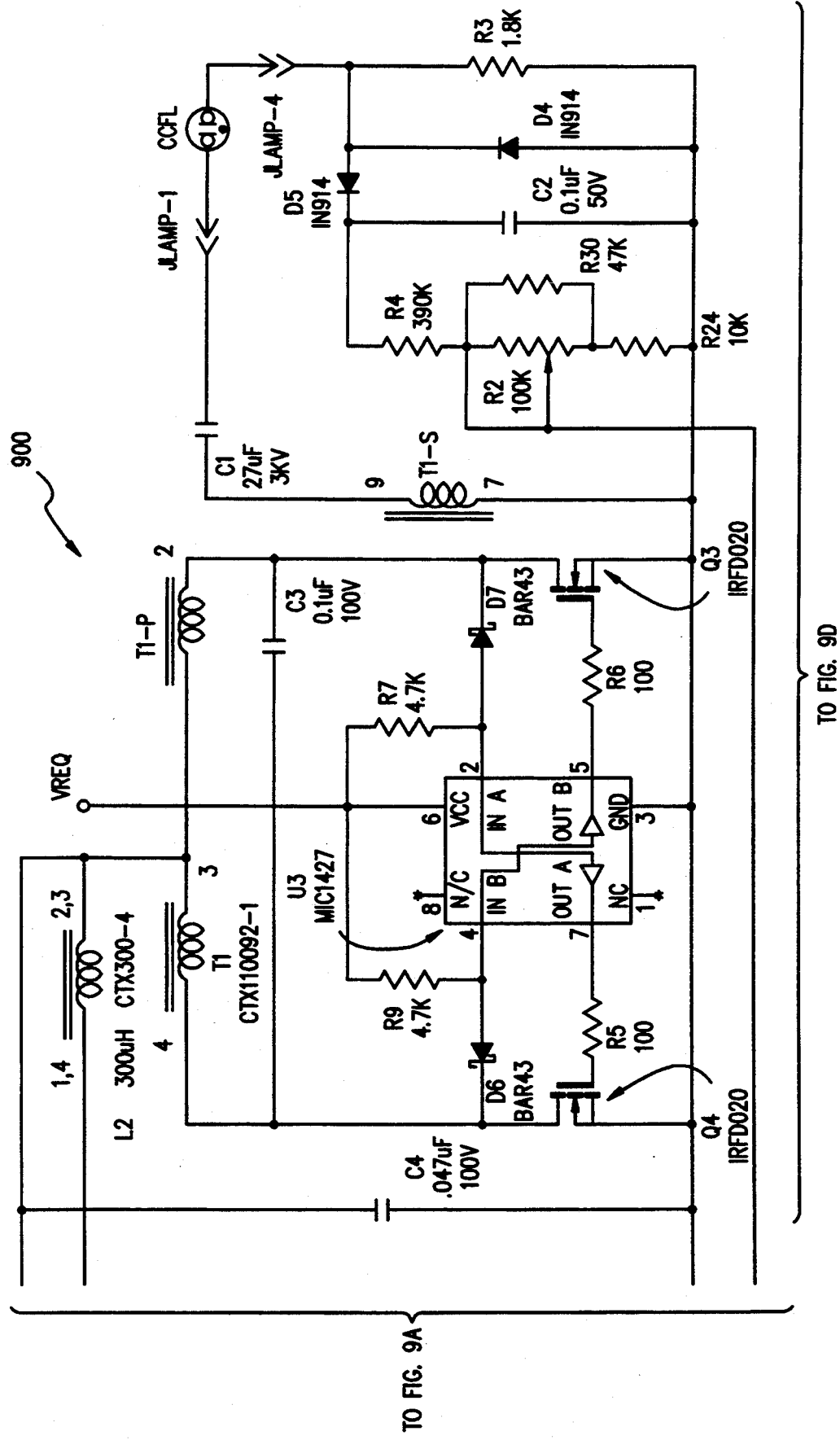
Figure 9D:
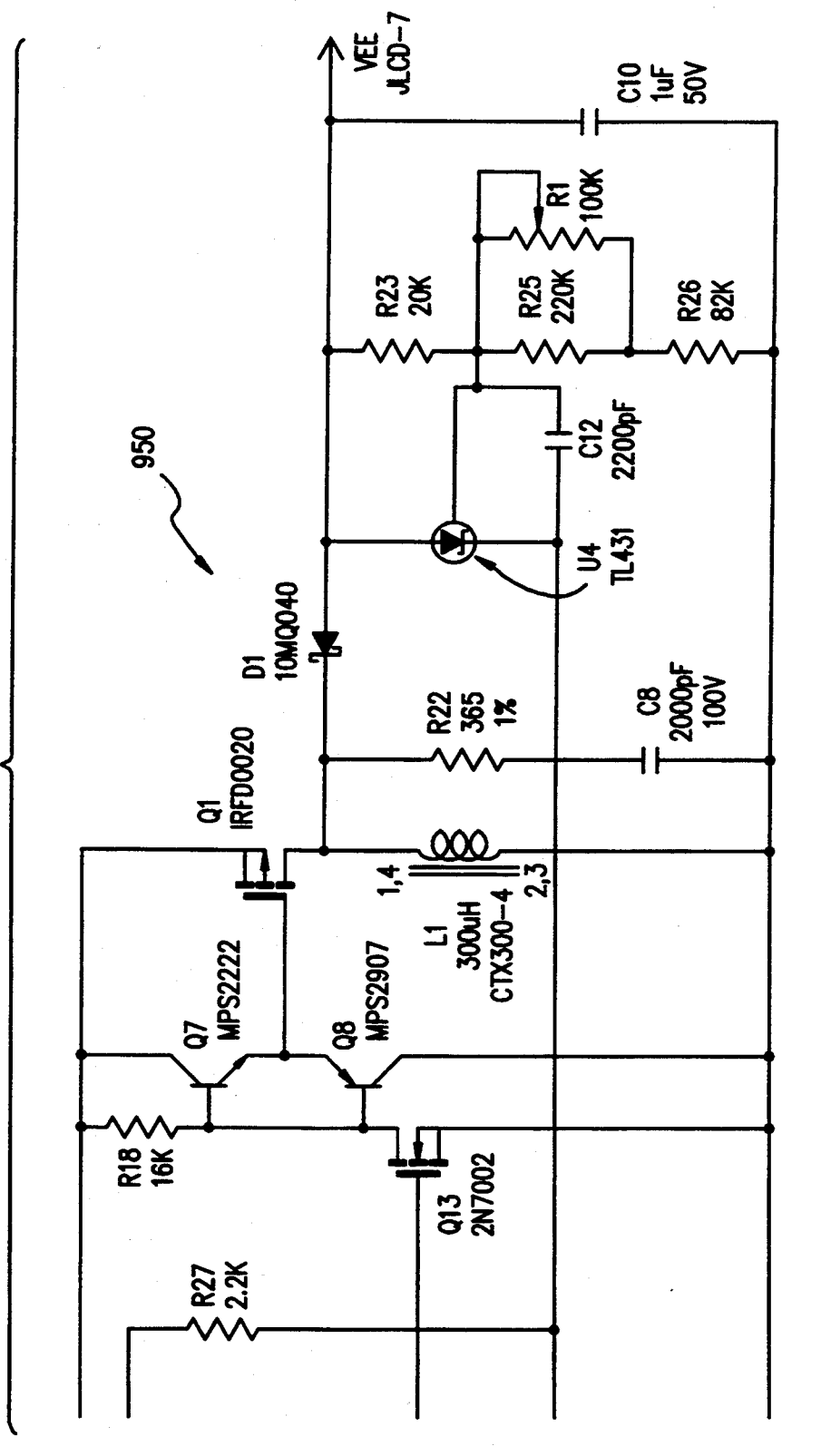

Inverter 400 permits alternative lamp CCFL arrangements as shown in FIG. 8 by simply adjusting the feedback for the proper voltage or current, although the transformer secondary must be increased to provide sufficient voltage for the lamps in series case. Otherwise, the components of inverter 400 need not be modified because none of the components were tuned to the operating point.

Modifications and Variations

The preferred embodiments may be modified in many ways while retaining one of more of the features of synchronous switching and FET push-pull with sinusoidal transformer operation.

For example, FIG. 9 shows a variant inverter 900 and modulator 950 of the preferred embodiment of FIG. 4 with basically the same overall circuit architecture.

However, some features of inverter 900 and regulator 950 differ from the corresponding ones of inverter 400. In particular, inverter 900 has npn Q9 in place of the n-channel FET Q9 of inverter 400; this substitution has the advantage that the arc striking voltage in CCFL decreases with temperature as does the base-emitter turn on voltage of an npn. Hence, the feedback with npn Q9 provides for a higher voltage in the secondary circuit for a cold start up than a for a warm start up, just as CCFL requires. This allows for smaller tolerance components.

Further, a high input at the at the ENABLE# terminal turns on FETs Q11 and Q12 which pulls down the gate of FET Q11 to turn Q 11 off; and with Q11 off the resistors R15 and R17 discharge capacitor C6 and pull node Vreg to ground to inactivate buffer circuit U3. Hence, both FET Q3 and Q4 turn off and no push-pull switching occurs and the no current flows in inductor L2 or transformer T1. Conversely, a low input at the ENABLE# terminal keeps Q12 off so comparator U1-1 can control Q11 to provide a regulated Vreg at about +5 volts.

Similarly, the feedback of V to comparators U1-3 and U1-4 uses FET Q10 with gate at +5 volts in place of resistor R11 of inverter 400 and regulator 450.

The inverting modulator 450 or 950 could be replaced by other topology modulators while retaining the synchrony of pass transistor switching. For example, inductor L1 and diode D1 could be exchanged to create a buck regulator.

Figure 10A:
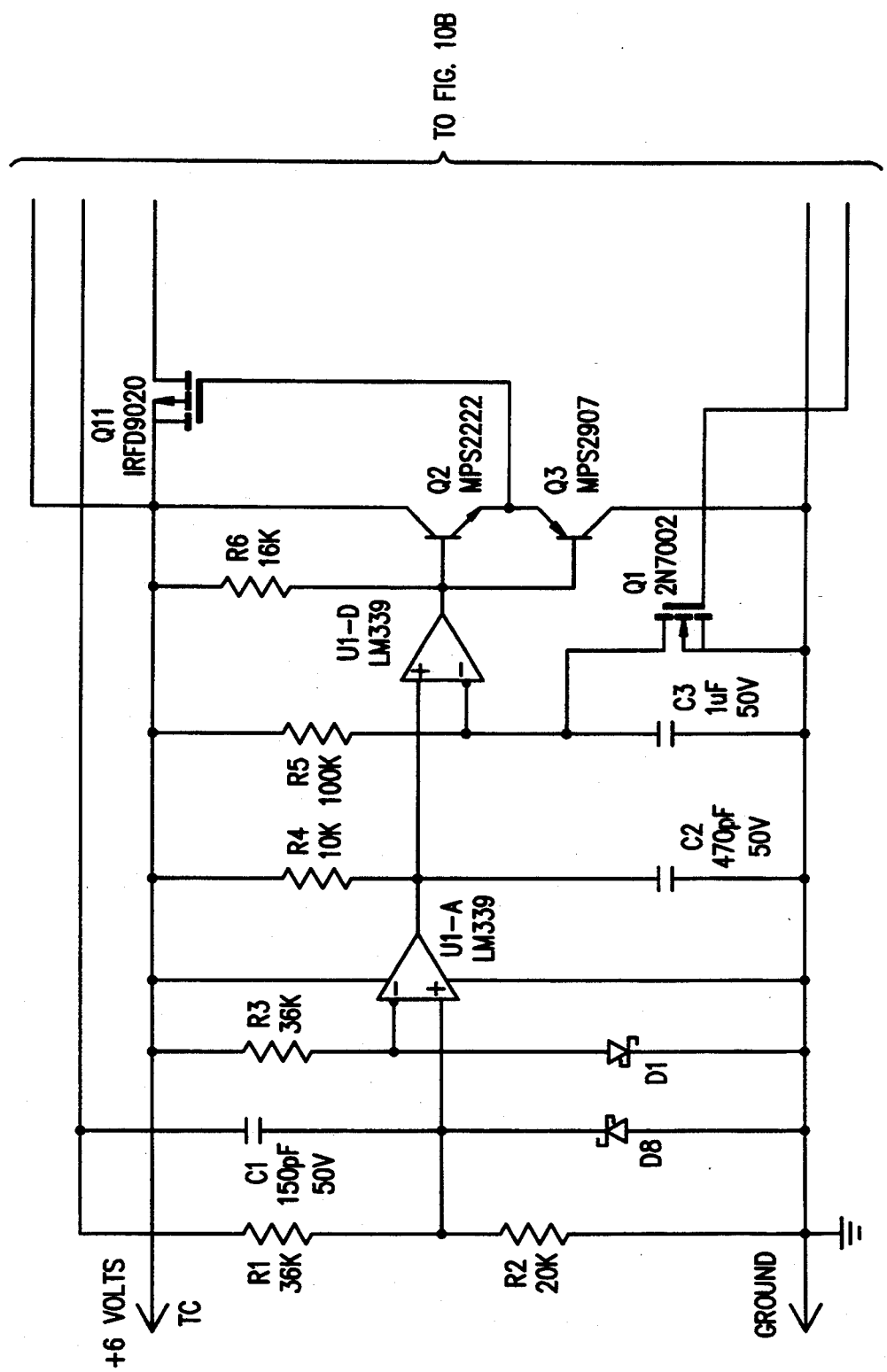
Figure 10B:
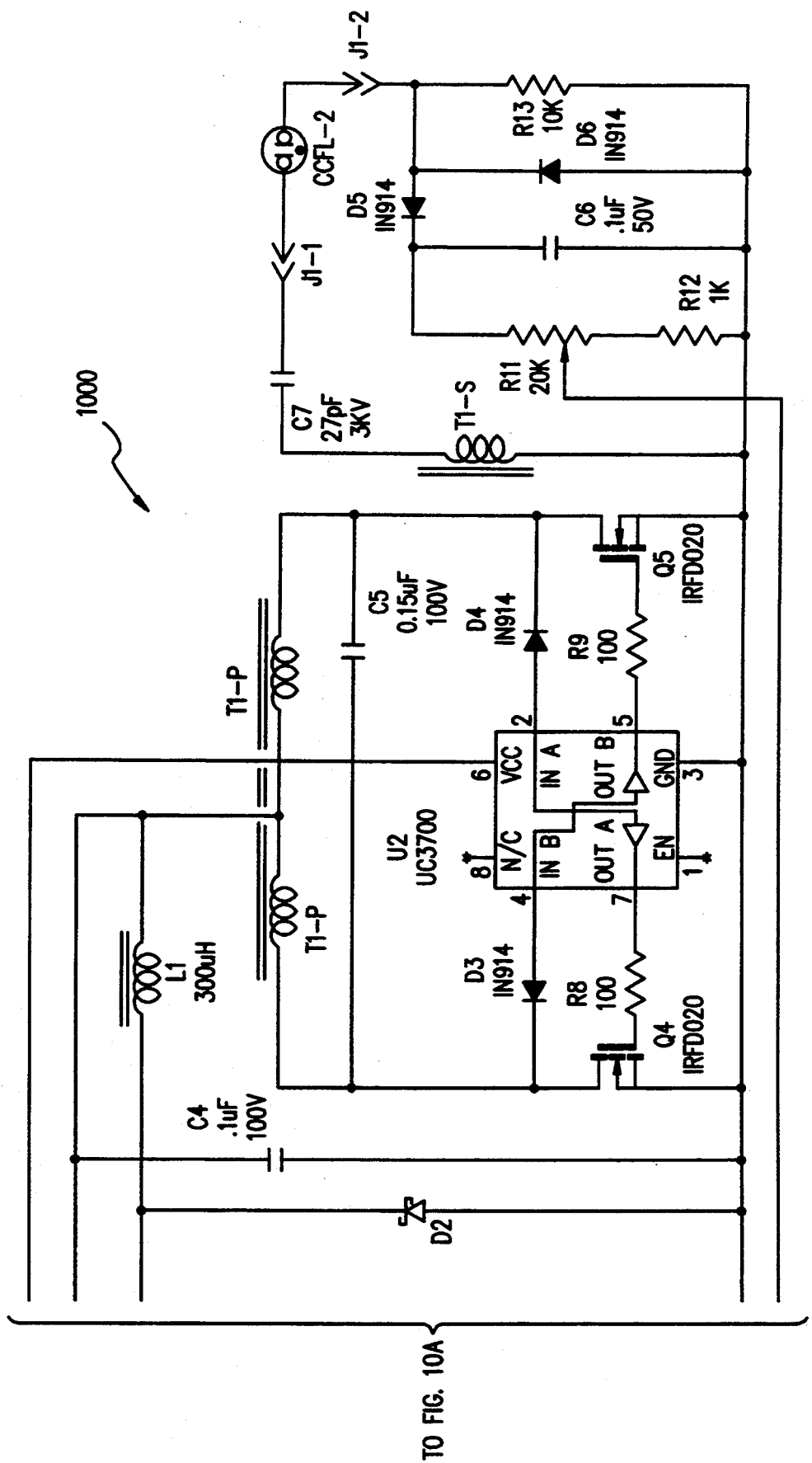

FIG. 10 shows simplified inverter 1000 which has an overall architecture analogous to inverters 400 and 900, but omits a synchronous regulator analogous to regulators 450 and 950. Inverter 1000 also omits enable circuitry, and the internal pull ups of buffer U2 take the place of resistors R7 and R9 of inverters 400 and 900. Also, capacitor C4 is 0.1 µF whereas capacitor C5 across the transformer primaries is only 0.015 µF. However, the reflected capacitance of C27 is close to 0.5 µF, so inverter 1000 resonants at about 12 KHz.

What is claimed is:

1. A DC-AC inverter, comprising:
   (a) a power input terminal;
   (b) an inductor;
   (c) a pass switch between said power input terminal and a first node of said inductor;
   (d) a transformer with first and second primaries and a secondary, first nodes of said primaries both coupled to a second node of said inductor;
   (f) a feedback circuit from said second node of said inductor to a driver coupled to a control of said pass switch;
   (g) first and second switches with said first switch coupled between a second node of said first primary and ground and said second switch coupled between a second node of said second primary and ground, and wherein said first and second switches are cross coupled, wherein a control of said first switch is coupled to said second node of said second primary and a control of said second switch is coupled to said second node of said first primary;
   (h) whereby said pass switch operates synchronously with a voltage at said second node of said second primary;
   (i) first and second buffers, said first buffer with input pulled up and diode-coupled to the drain of said first n-channel transistor and with output coupled to the gate of said second n-channel transistor, and said second buffer with input pulled up and diode-coupled to the drain ot said second n-channel transistor and with output coupled to the drain of said ilrst n-channel transistor;
   wherein said pass switch is a p-channel field effect transistor;
   wherein said driver connects to the gate of said p-channel transistor; and
   wherein said first and second switches are n-channel field effect transistors.

2. The inverter of claim 1, further comprising:
a capacitor connected between said first primary and said second primary.

3. The inverter of claim 1, further comprising:
   (a) a current sense circuit coupled to said secondary; and
   (b) a second feedback circuit from said current sense circuit to said driver, said second feedback circuit providing a voltage level to said driver and negatively correlated to the duty cycle of said pass switch.

4. The inverter of claim 1, further comprising:
a capacitor connected between said first primary and said second primary.

5. The inverter of claim 1, further comprising:
   (a) a current sense circuit coupled to said secondary; and
   (b) a second feedback circuit from said current sense circuit to said driver, said second feedback circuit providing a voltage level to said driver and negatively correlated to the duty cycle of said pass switch.

6. A DC-AC inverter: comprising:
   (a) a power input terminal:
   (b) an inductor;
   (c) a pass switch between said power input terminal and a first node of said inductor;
   (d) a transformer with first and second primaries and a secondary, said first nodes of said primaries both coupled to a second node of said inductor;
   (f) a feedback circuit from said second node of said inductor to a driver coupled to a control of said pass switch;
   (g) whereby said pass switch operates synchronously with the voltage at said second node;
   (h) first and second buffers, said first buffer with input pulled up and diode-coupled to the drain of a first n-channel transistor and with output coupled to the gate of a second n-channel transostpr, and said second buffer with input pulled up and diode-coupled to the drain of said second n-channel transistor and with output coupled to the drain of said first n-channel transistor;
   (j) wherein said pass switch is a p-channel field effect transistor;
   (k) wherein said driver connects to the gate of said p-channel transistor; and
   (l) wherein said first and second switches are n-channel field effect transistors.

7. A system power supply, comprising:
   (a) a power input terminal;
   (b) a DC-AC inverter, including:
      (i) an inductor;
      (ii) a first pass switch between said power input terminal and a first node of said inductor;
      (iii) a transformer with first and second primaries and a secondary, first nodes of said primaries both coupled to a second node of said inductor;

(iv) a feedback circuit from said second node to a first driver coupled to a control of said first pass switch; and (v) first and second switches with switches with said first switch coupled between a second node of said first primary and ground and said second switch coupled between a second node of said second primary and ground, and wherein said first and second switches are cross coupled, wherein a control of said first switch is coupled to said second node of said second primary and a control of said second switch is coupled to said second node of said first primary;

(c) a regulator including:
  (i) a second pass switch coupled to said power input terminal; and
  (ii) a second feedback circuit from said second node of said inductor to a second driver coupled to control-said second pass switch;

(d) whereby both said first pass switch and said second pass switch operate synchronously with a voltage at said second node of said inductor.

8. The power supply of claim 7, further comprising:
(a) an inductor coupled between said second pass switch and ground; and
(b) a diode with cathode coupled to said second pass switch and said inductor;
(c) whereby said regulator is an inverting regulator.

9. The power supply of claim 7, wherein;
(a) said first pass switch is a p-channel field effect transistor;
(b) said first driver compeers to the gate of said p-channel transistor; and
(c) said first and second switches are n-channel field effect transistors.

10. The power supply of claim 9, further comprising:
(a) first and second buffers, said first buffer with input pulled up and diode-coupled to the drain of said first n-channel transistor and with output coupled to the gate of said second n-channel transistor, and said second buffer with input pulled up and diode-coupled to the drain of said second n-channel transistor and with output coupled to the drain of said first n-channel transistor.

11. The power supply of claim 10, further comprising:
(a) a current sense circuit coupled to said secondary; and
(b) a third feedback circuit from said current sense circuit to said first driver, said third feedback circuit providing a voltage level to said first driver and negatively correlated to a duty cycle of said first pass switch.

12. The power supply of claim 7, further comprising:
a capacitor connected between said first primary and said second primary.

* * * * *